US008073877B2

(12) United States Patent
Irmak et al.

(10) Patent No.: US 8,073,877 B2
(45) Date of Patent: Dec. 6, 2011

(54) SCALABLE SEMI-STRUCTURED NAMED ENTITY DETECTION

(75) Inventors: Utku Irmak, Santa Clara, CA (US); Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 322 days.

(21) Appl. No.: 12/356,467

(22) Filed: Jan. 20, 2009

(65) Prior Publication Data
US 2010/0185691 A1 Jul. 22, 2010

(51) Int. Cl.
*G06F 17/30* (2006.01)

(52) U.S. Cl. ........ 707/803; 707/759; 707/766; 707/769; 707/770; 707/822

(58) Field of Classification Search ...... 704/9; 707/803, 707/759, 766, 769, 770, 822
See application file for complete search history.

(56) References Cited

U.S. PATENT DOCUMENTS

| | | | | |
|---|---|---|---|---|
| 7,558,778 | B2 * | 7/2009 | Carus et al. | 1/1 |
| 7,574,048 | B2 * | 8/2009 | Shilman et al. | 382/187 |
| 7,672,833 | B2 * | 3/2010 | Blume et al. | 704/10 |
| 2010/0227301 | A1 * | 9/2010 | Yu et al. | 434/118 |
| 2010/0318537 | A1 * | 12/2010 | Surendran et al. | 707/759 |

OTHER PUBLICATIONS

"Named entity recognition", downloaded from http://en.wikipedia.org/wiki/Named_entity_recognition on Jan. 20, 2009.
McCallum, A. et al., "Early Results for Named Entity Recognition with Conditional Random fields, Feature Induction and Web-Enhanced Lexicons", downloaded from http://www.cs.umass.edu/~mccallum-conll2003 on Jan. 20, 2009.
P. Turney, "Mining the Web for Synonyms: PMI-IR Versus LSA on TOEFL", in Proceedings of the Twelfth European Conference on Machine Learning, 2001.
E. Agichtein, et al., "Snowball: Extracting Relations from Large Plain-Text Collections", in Proceedings of the Fifth ACM Conference on Digital Libraries, 2000.
D. Appelt, et al., "FASTUS: A Finite-State Processor for Information Extraction from Real-World Text", In Proceedings of IJCAI-93, 1993.
D. E. Appelt, et al., "SRI International FASTUS System MUC-6 Test Results and Analysis". In Proceedings of the Sixth Message Understanding Conference (MUC-6), pp. 237-248, San Francisco, 1995.
S. Baluja, et al., "Applying Machine Learning for High Performance Named-Entity Extraction", Computational Intelligence, 16(4), Nov. 2000.
O. Bender, et al., "Maximum Entropy Models for Named Entity Recognition", In Seventh Conference on Natural Language Learning (CoNLL-03), 2003.
D. M. Bikel, et al., "An Algorithm that Learns What's in a Name", Machine Learning, 34(1-3):211-231, 1999.

(Continued)

*Primary Examiner* — Jean M Corrielus
(74) *Attorney, Agent, or Firm* — Weaver Austin Villeneuve & Sampson LLP

(57) ABSTRACT

Disclosed are methods and apparatus for performing named entity recognition. A set of candidates and corresponding contexts are obtained, each of the set of candidates being a potential seed example of an entity. The contexts of at least a portion of the set of candidates are compared with contexts of a set of seed examples of the entity such that a subset of the set of candidates are added to the set of the seed examples. A set of rules are created from the set of seed examples obtained in the comparing step. A final set of seed examples of the entity is generated by executing the set of rules against the set of candidates.

27 Claims, 7 Drawing Sheets

OTHER PUBLICATIONS

S. Brin, "Extracting Patterns and Relations from the World Wide Web", In Proceedings of the First International Workshop on the Web and Databases, 1998.

Y.-Y. Chen, et al., "Efficient Query Processing in Geographic Web Search Engines", In Proceedings of the 2006 ACM SIGMOD International Conference on Management of Data, 2006.

M. Collins, et al., "Unsupervised Models for Named Entity Classification", In Proceedings of the Joint SIGDAT Conference on Empirical Methods in Natural Language Processing and Very Large Corpora, 1999.

C. Elkan, et al., "Learning Classifiers from Only Positive and Unlabeled Data", In Proceeding of the 14th ACM SIGKDD International Conference on Knowledge Discovery and Data Mining, 2008.

O. Etzioni, et al., "Unsupervised Named-Entity Extraction from the Web: An Experimental Study", Artificial Intelligence, 165(1):91-134, 2005.

R.-E. Fan,e t al., "Liblinear: A Library for Large Linear Classification", Journal of Machine Learning Research, 9:1871-1874,2008.

R. Farkas, et al., "An Iterative Method for the De-Identification of Structured Medical Text", In Proceeding of AMIA I2B2NLP Workshop, 2006.

R. Grishman, et al., "Design of the MUC-6 Evaluation", In Proceedings of the Sixth Message Understanding Conference (MUC-6), pp. 1-11, San Francisco, 1995.

W.S. Lee, et al., "Learning with Positive and Unlabeled Examples Using Weighted Logistic Regression", In Proceedings of the Twentieth International Conference on Machine Learning, 2003.

M. PaŞca, "Organizing and Searching the World Wide Web of Facts—Step Two: Harnessing the Wisdom of the Crowds", in WWW '07: Proceedings of the 16th International Conference on World Wide Web, 2007.

M. PaŞca, et al., "The Role of Documents vs. Queries in Extracting Class Attributes from Text", In CIKM '07: Proceedings of the Sixteenth ACM Conference on Information and Knowledge Management, 2007.

J. Parikh, et al., "Unity: Relevance Feedback Using User Query Logs", In Proceedings of the 25th Annual International ACM SIGIR Conference on Research and Development in Information Retrieval, 2006.

M. PaŞca, et al., "Organizing and Searching the World Wide Web of Facts—Step One: The One-Million Fact Extraction Challenge", In Proceedings of the 21st National Conference on Artificial Intelligence, 2006.

E. Riloff, "Automatically Constructing a Dictionary for Information Extraction Tasks", In Proceedings of the Eleventh National Conference on Artificial Intelligence, 1993.

E. Riloff, et al., "Learning Dictionaries for Information Extraction by Multi-Level Bootstrapping",In Proceedings of the Sixteenth National Conference on Artificial Intelligence, 1999.

G. Salton, et al., "Term Weighting Approaches in Automatic Text Retrieval", Technical Report, Ithaca, NY, USA, 1987.

B. Scholkopf, et al., "Estimating the Support of a High-Dimensional Distribution", Neural Comput., 13(7):1443-1471, 2001.

M. Thelen, et al., "A Bootstrapping Method for Learning Semantic Lexicons Using Extraction Pattern Contexts", In Proceedings of the 2002 Conference on Empirical Methods in Natural Language Processing, 2002.

V. Von Brzeski, et al., "Leveraging Context in User-Centric Entity Detection Systems", In CIKM, pp. 691-700, ACM, 2007.

H. Yu, "Single-Class Classification with Mapping Convergence", Machine Learning, 61(1-3):49-69, 2006.

H. Yu, et al., "Pebl: Web Page Classification Without Negative Examples", IEEE Transactions on Knowledge and Data Engineering, 16:70-81, 2004.

* cited by examiner

SCALABLE SEMI-STRUCTURED NAMED ENTITY DETECTION

BACKGROUND OF THE INVENTION

The present invention relates generally to computer implemented Named Entity Recognition (NER).

Named Entity Recognition (NER) refers to the process of locating and classifying parts of free text into a set of predefined categories. For instance, categories of entities may include people, locations, and organizations. Unfortunately, many processes for performing NER fail to locate and classify many entities of interest. Moreover, processes for performing NER may also incorrectly locate and classify text into a particular category of entity.

SUMMARY OF THE INVENTION

Methods and apparatus for automatically performing named entity recognition are disclosed.

In accordance with one embodiment, a set of candidates and corresponding contexts are obtained, each of the set of candidates being a potential seed example of an entity. The contexts of at least a portion of the set of candidates are compared with contexts of a set of seed examples of the entity such that a subset of the set of candidates are added to the set of the seed examples. A set of rules are created from the set of seed examples obtained in the comparing step. A final set of seed examples of the entity is generated by executing the set of rules against the set of candidates.

In accordance with another embodiment, a set of candidates and corresponding contexts are obtained, each of the set of candidates being a potential seed example of an entity. A set of seed examples of the entity is obtained. The contexts of at least a portion of the set of candidates are compared with contexts of the set of seed examples of the entity to determine a similarity score associated with each of the set of candidates. The at least a portion of the set of candidates are ranked according to the corresponding similarity scores. A subset of the set of candidates is selected according to the ranking. The selected subset of the set of candidates is added to the set of seed examples. A set of rules is created from the set of seed examples resulting from the adding step. A final set of seed examples of the entity is generated by executing the set of rules against the set of candidates.

In accordance with yet another embodiment, a set of candidates and corresponding contexts are obtained, each of the set of candidates being a potential seed example of an entity and each of the corresponding contexts including one or more seed terms. A set of seed examples of the entity and corresponding contexts are obtained, wherein each of the set of seed examples includes an expression and each of the corresponding contexts includes one or more seed terms. The expressions of the set of seed examples are compared with the set of candidates to find a positive set of candidates that each matches at least one of the expressions. The contexts of the positive set of candidates are compared with contexts of the set of seed examples of the entity to determine a similarity score associated with each of the set of candidates. The set of candidates are ranked according to the corresponding similarity scores. A subset of the set of candidates is selected according to the ranking. The selected subset of the set of candidates is added to the set of seed examples, wherein adding includes converting each of the selected subset of the set of candidates to an expression. A set of rules is created from the set of seed examples resulting from the adding step. A final set of seed examples of the entity is generated by executing the set of rules against the set of candidates, wherein each seed example in the final set of seed examples includes an expression.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
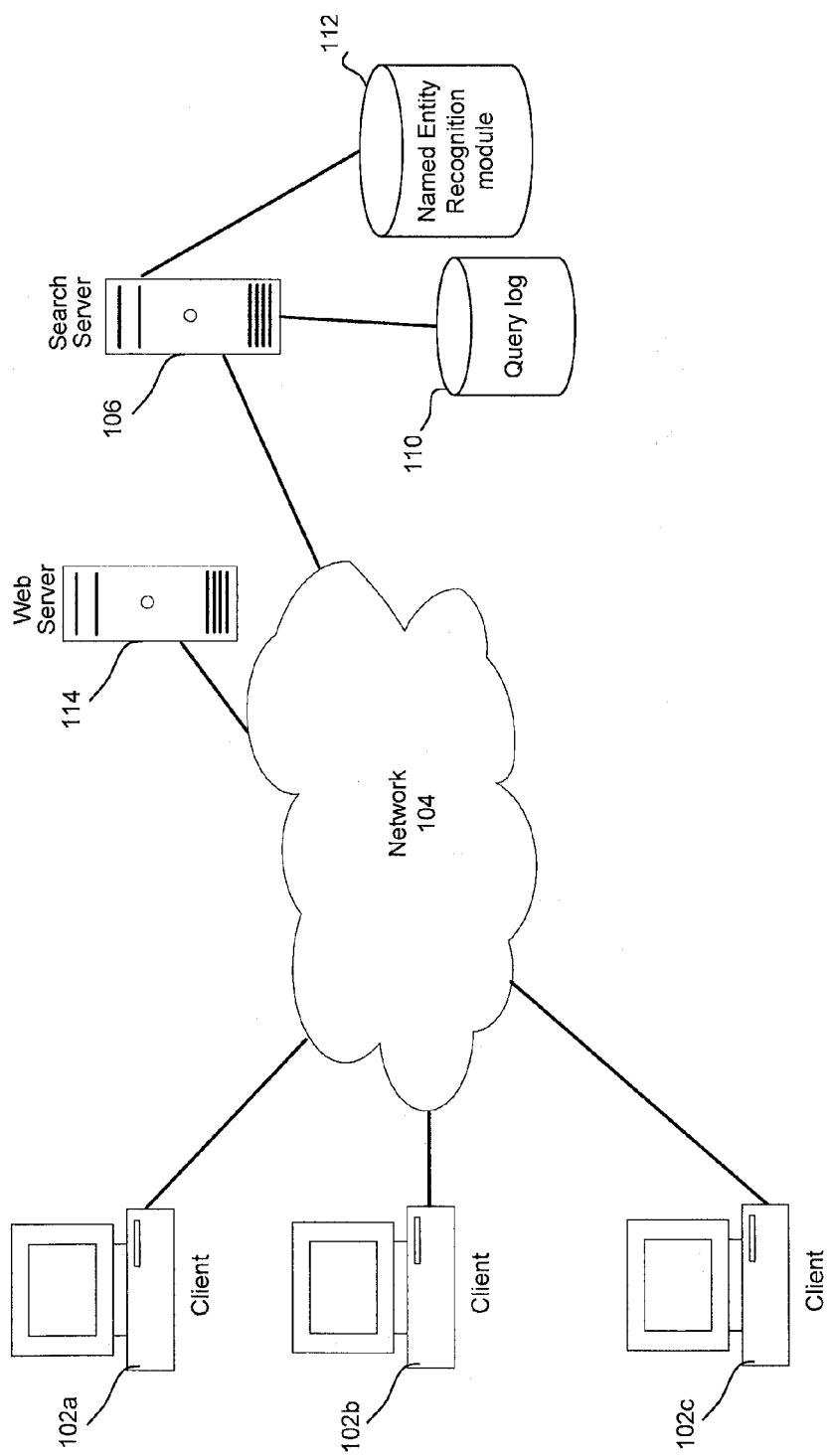
FIG. 1 is a block diagram illustrating an example system in which various embodiments may be implemented.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Extensive research has been performed on the detection of text representing or identifying named entities such as people, locations, and organizations within a document. For purposes of the following description, a document may be any electronic file that includes text.

A document may be identified by a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

The syntactic format of text representing or identifying people, locations, and organizations is generally well defined. As a result, many existing processes for performing NER to identify the names of these entities yield high rates of precision. However, the syntactic format and structure of entities such as phone numbers, dates, times, and currencies are not as well-defined. These types of entities may be referred to as semi-structured named entities.

Semi-structured entities often follow certain syntactic formats according to some conventions. However, the structure of semi-structured entities is typically not well-defined. This makes it very challenging to achieve a high detection accuracy for these entities. As a result, regular expressions for detecting these entities are often manually created and handtuned. Unfortunately, this manual approach is not scalable if one wants to detect these entities within documents in different languages.

The disclosed embodiments support the location, detection, and/or classification of one or more named entities. These named entities may include semi-structured named entities. However, the entities need not be semi-structured named entities. Moreover, the entities listed herein are merely examples, and therefore the disclosed embodiments may be applicable to a variety of entities.

The disclosed embodiments may be applied in a variety of contexts. For example, entities may be identified in documents such as web pages in response to a search query submitted via the Internet. As another example, it may be desirable to identify entities in order to answer a question (e.g., submitted via the Internet), identify documents (e.g., via search engines), or summarize text (e.g., for purposes of summarizing a document listed as a search result).

One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

Embodiments disclosed herein may be implemented via a Named Entity Recognition module 112, which may be coupled to the search server 106. The disclosed embodiments may be implemented via software and/or hardware.

Figure 2:
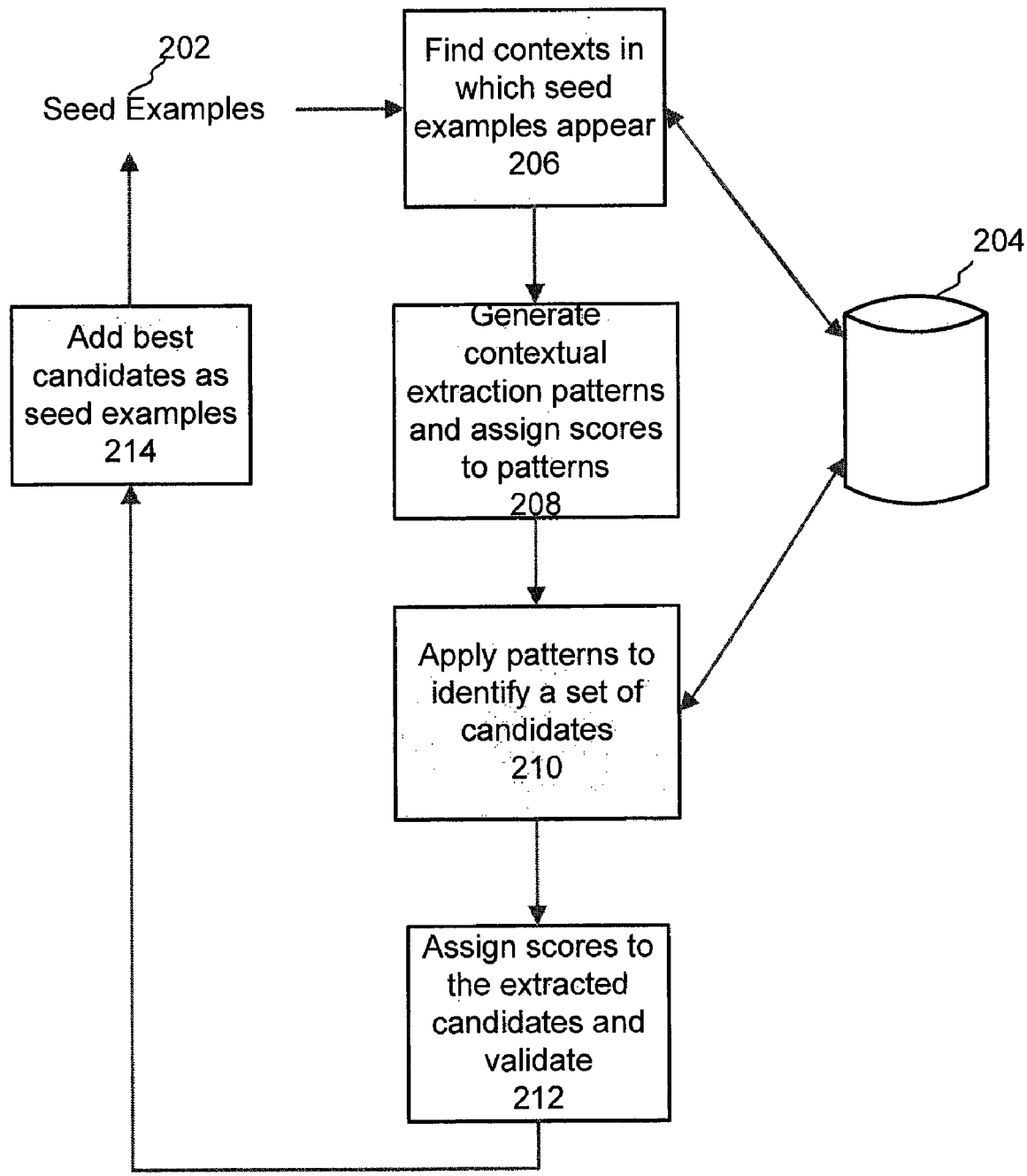
FIG. 2 is a process flow diagram illustrating an example method of performing named entity detection.

FIG. 2 is a diagram illustrating an example method of performing entity detection. The system may start with a set of seed examples of an entity (e.g., phone number, date, or time) at 202, which may be provided by a user. For instance, a seed example of a phone number entity is (415)555-1212. The set of seed examples may initially contain a small number of seed examples. The system may then find occurrences of the seed examples at 204 in a large set of documents (i.e., corpus) 206 in order to find contexts in which the seed examples appear. For instance, a context for a phone number entity may be "I can be reached at _____," where the underlined portion represents a seed example. By analyzing these occurrences, the system may generate contextual extraction patterns and assign confidence scores to the patterns at 208. For instance, a contextual extraction pattern may be "I can be reached at". The system may then apply these contextual extraction patterns to the set of documents in order to identify a set of candidates at 210. Based upon a validation mechanism, the system may assign scores to the set of candidates at 212. Based upon the assigned scores, the system may add the best candidates to the set of seed examples (i.e., seed set) at 214. The system may then continue to perform similar iterations at 202. At each iteration, the system may learn additional contextual extraction patterns and identify additional seed examples.

As described with reference to FIG. 2, the method learns extraction patterns by analyzing the occurrences of the seed examples within various documents, which in return enables extraction of more seed examples. Thus, the success of the method described above with reference to FIG. 2 depends on how the patterns are generated and also the mechanism employed for choosing the best candidates to be added to the set of seed examples for use in subsequent iterations.

Since the discovery of new examples depends on the extraction patterns learned, these patterns should be general enough to identify a large percentage of seed examples that satisfy these patterns. However, patterns that are too general may introduce noisy examples, which may cause undesirable affects in the subsequent iterations.

Figure 3:
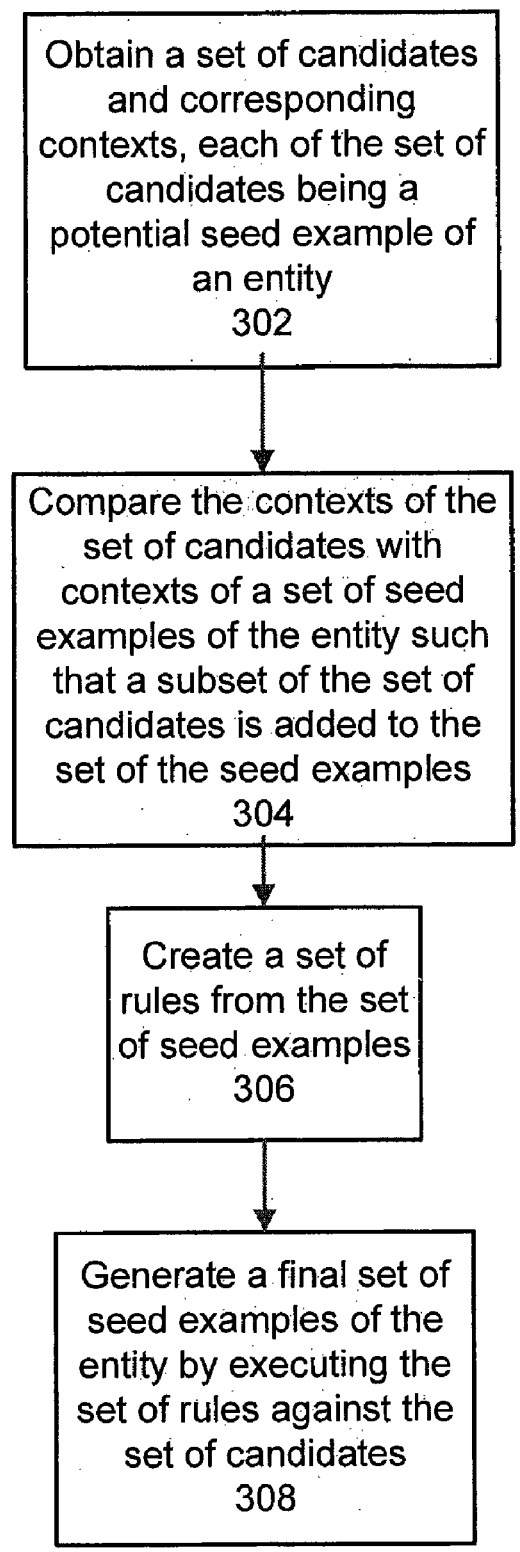
FIG. 3 is a process flow diagram illustrating an example general method of performing entity detection in accordance with various embodiments.

FIG. 3 is a process flow diagram illustrating an example general method of performing entity detection in accordance with various embodiments. The system may obtain a set of candidates (e.g., a large set of candidates) and corresponding contexts at 302, where each of the set of candidates is a potential seed example of an entity. Each of the contexts may include text preceding and/or text following a corresponding one of the set of candidates. The system may obtain the set of candidates and corresponding contexts from a plurality of documents. Step 302 may be referred to as the "first level" of a three-level framework, as will be described in further detail below with reference to FIG. 4.

The system may obtain an initial set of seed examples from a user or other data source (e.g., file). The system may compare the contexts of the set of candidates with the contexts of the set of seed examples of the entity such that a subset of the set of candidates is added to the set of the seed examples at 304. Specifically, the system may identify the subset of the set of candidates to be added to the set of seed examples based upon the similarity of the contexts, as will be described in further detail below with reference to FIG. 4. Step 304 may be referred to as the "second level" of the three-level framework.

The system may create a set of rules from the set of seed examples at 306. For instance, each of the set of rules may include a pattern such as "(DDD) DDD-DDDD" to be identified in documents being searched. Various rules may also be represented by a regular expression using terms such as "AND," "OR," and "NOT." The system may then generate a final set of seed examples of the entity by executing the set of rules against the set of candidates at 308. The "third level" of the three-level framework may be represented by steps 306 and 308.

Figure 4:
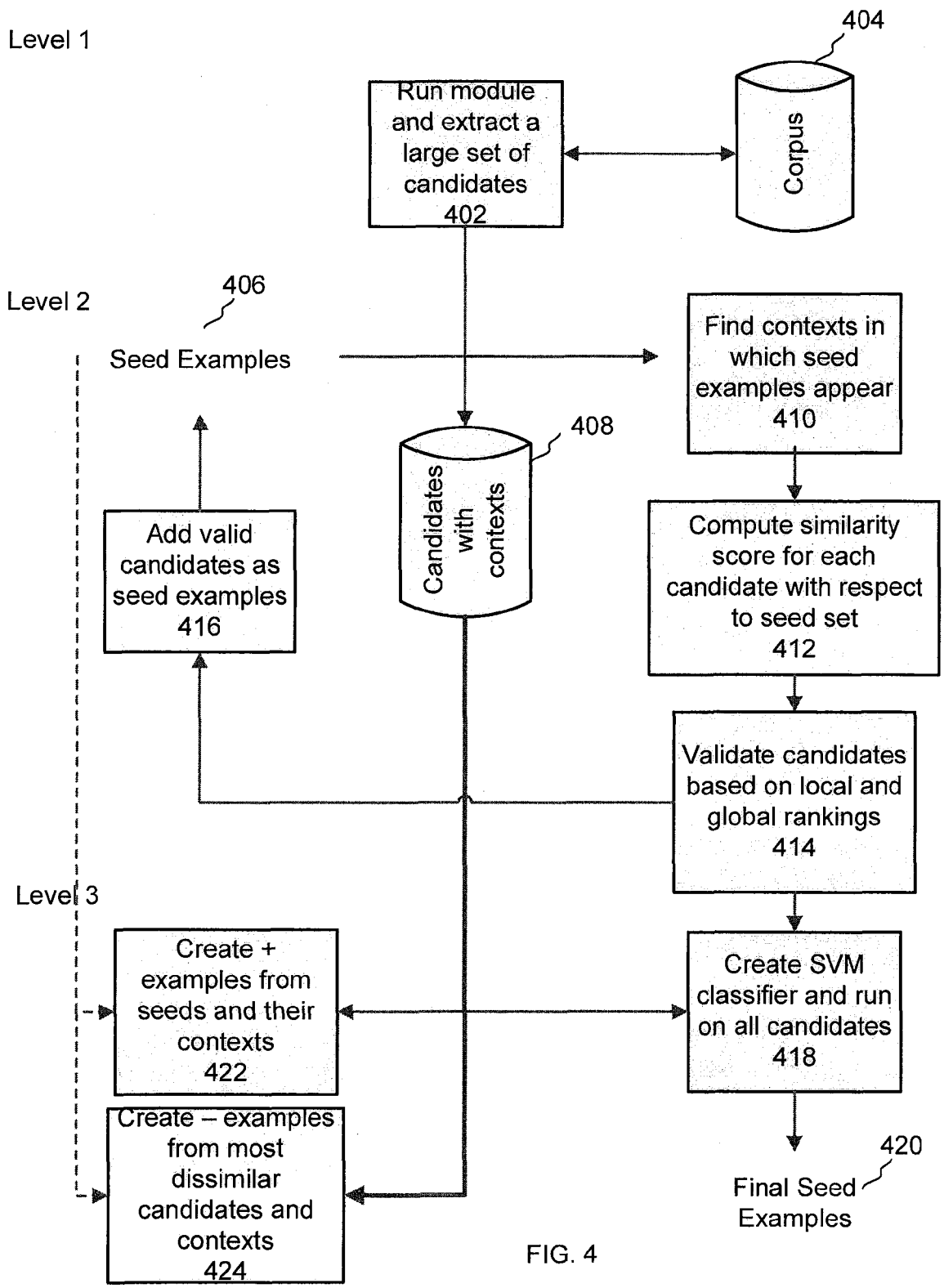
FIG. 4 is a process flow diagram illustrating an example method of performing entity detection in accordance with a three-level framework.

FIG. 4 is a process flow diagram illustrating an example method of performing entity detection in accordance with a three-level framework. At the first level, the system may obtain a set of candidates (e.g., a large set of candidates) and corresponding contexts at 402, where each of the set of candidates is a potential seed example of an entity. Specifically, each candidate may occur in one or more contexts. Thus, a single candidate may have a set of one or more contexts associated therewith. Each of the contexts may include text preceding and/or text following a corresponding one of the set of candidates. Specifically, a context may be referred to as a "window" that surrounds the candidate. The window size may be any number of words, bytes, or characters. As shown in this example, the system may obtain the set of candidates and corresponding contexts from a plurality of documents 404 (e.g., corpus).

The first level may function to provide a mechanism that can help avoid the problem of balancing the trade-off between the generation of general rules or patterns, while reducing the number of noisy examples resulting from the application of the rules or patterns. In other words, one goal may be to achieve high recall rates with moderate precision. This may be accomplished through the use of one or more software modules that may extract a large set of candidates from the plurality of documents 404. The implementation of the module may depend upon the targeted entities.

In one embodiment, the module(s) may be implemented through various rules, which may contain various regular expressions. This implementation may be desirable for extracting semi-structured named entities, since these target entities typically have some syntactical patterns, even though the patterns may not be strong enough to be reliable.

In another embodiment, the module(s) may be implemented by leveraging various off-the-shelf products that "tag" (e.g., identify) named entities, where the targeted entities include named entities, such as person, organization, or location.

At the second level, the system may obtain an initial set of seed examples 406 from a user or other data source (e.g., file). A seed example may include a seed and have a corresponding context. A seed may be represented by a seed pattern (e.g., (DDD) DDD-DDDD), while the context may include one or more seed terms (e.g., call, phone, fax, contact). In addition, the set of candidates and corresponding contexts obtained at 402 may be stored at 408. Specifically, each of the set of candidates may be associated with a set of one or more contexts. Since candidates may share contexts, candidates may be associated with contexts via pointers or other memory saving mechanism.

The goal of the second level is to identify and move a subset of the candidates to the set of the seed examples with substantial accuracy. In order to achieve this goal, the system may compare the contexts of the set of candidates with the contexts of the set of seed examples of the entity at 410. Through this comparison, the system may identify the subset of candidates having contexts that are most similar to the contexts of the set of seed examples (e.g., in comparison to the remaining candidates). The similarities may be represented by "similarity scores" of the candidates. If the contexts in which a candidate appears overlaps significantly with the contexts observed for the seed examples, then the similarity score of the candidate should be high. Thus, the system may compute a similarity score for each of the set of candidates with respect to the set of seed examples at 412, and compare the similarity scores of the set of candidates to identify a subset of the set of candidates having the highest similarity scores. Various similarity functions may be used to determine the similarity score of each candidate.

One similarity function that may be applied is the cosine similarity function. This metric assigns scores to matching terms based upon their tf*idf scores, where tf stands for the term frequency and idf stands for the inverse document frequency. The term frequency identifies the frequency with which the matching term is found in all of the contexts of the candidate, while the inverse document frequency identifies the inverse of the frequency with which the matching term is found in all of the documents. Specifically, the system identifies terms in the context(s) of a candidate that match terms in the context(s) of one or more of the set of seed examples. The system may then assign a score to each of the matching terms of the candidate by multiplying the tf and the idf. The scores for each of the matching terms of the candidate may then be added to obtain a final similarity score for the candidate. If the contexts of a given candidate share many significant terms with the contexts of the seed examples, then the final similarity score computed for the candidate will be high.

Another similarity function that may be applied is the cosine similarity with distances function. This metric is similar to the cosine similarity function. However, in this approach, the score for each matching term of a candidate is divided by a log(distance) value, where the distance stands for the sum of the word positions of the matched term in both the candidate and seed example contexts. Thus, the system ascertains a distance for each matched term in both the candidate and seed example contexts. For instance, where the matched term is the first term in the context, the distance may be one. The resulting values for the matching terms of the candidate may then be added to obtain a final similarity score for the candidate.

A longest string length function may be applied to determine the length of the longest prefix string(s) and the longest suffix string(s) shared by the candidate and at least one of the set of seed examples. Specifically, each prefix string and suffix string need not be found in the contexts of same seed example. In other words, the prefix string and suffix string may be found in the contexts of different seed examples. The length of a string may be determined by the number of terms in the string. Alternatively, the length may be the number of characters or bytes in the string. A prefix may be defined as the string in a context that occurs immediately prior to the candidate, while a suffix may be defined as the string in a context that occurs immediately after the candidate. For instance, a context of a phone number may be "Call me tomorrow at _____." Thus, the prefix length in this example is 4, while the suffix length is 0 (since there are no terms following the phone number). The system may therefore ascertain the length of prefix and suffix strings shared by the candidate and the set of seed examples. The similarity score of a candidate may be the sum of the length of the longest prefix string shared by the candidate and a seed example, and the length of the longest suffix string shared by the candidate and a seed example. In another embodiment, the similarity score may be the sum of the length of the longest prefix string shared by the candidate and a seed example, and the longest suffix string shared by the candidate and a seed example divided by two (the number of strings). Alternatively, the similarity score of a candidate may be the sum of the length of one or more longest shared prefix strings and the length of one or more longest shared suffix strings divided by the total number of strings (combined prefix and suffix strings).

Based upon the similarity scores of the set of candidates, the candidates may be ranked. Those candidates having the highest ranking may be identified, and this subset of candidates may be added (e.g., moved) to the set of seed examples. This subset of candidates (and corresponding contexts) may therefore be removed from the set of candidates (and corresponding contexts) for purposes of subsequent iterations of the second level. The system may identify those candidates having the highest ranking through a validation process. The system may implement the validation process by considering at least one of two different rankings. These two rankings include a local ranking and a global ranking.

The system may perform a local ranking by ranking each of the set of candidates processed in the current iteration. The system may identify the highest ranking candidates according to a local ranking threshold (e.g., top 1% or 2%).

The system may perform a global ranking by keeping track of the scores of the set of candidates in all of the iterations (at the second level) performed for the entity. The system may select those highest ranking candidates according to the global ranking (e.g., top 3% or 5%). Alternatively, the system may select those candidates that are ranked above the local ranking threshold according to the local ranking, and above the global ranking threshold according to the global ranking. In this manner, the system may validate candidates based upon local and global rankings at 414. The subset of candidates including the selected (e.g., validated) candidates may then be added as seed examples to the set of seed examples at 416. As shown in FIG. 4, these additional seed examples will be included in the seed examples 406 that are processed in a subsequent iteration of the second level. In this manner, additional seed examples are identified with high precision.

This second-level is superior to prior art approaches of applying extraction patterns to identify additional seed examples. Moreover, while the disclosed embodiments enable validation to be performed based upon the similarities of the contexts of candidates with the contexts of the seed examples, many prior art methods select candidates based upon the confidence scores of extraction patterns that generated the candidates. Actual contexts produce superior results to extraction patterns that are merely generated based upon contexts.

The validation process may also be used to determine when the second-level processing stops. Specifically, if the system determines that fewer candidates than a predetermined threshold are moved to the set of seed examples in the current iteration, the system may determine that the iterations of the second level of the three-level process should end. This will eventually occur since the similarity of the remaining candidates will not compare with the high global rankings obtained among the seed examples. Where both local and global rankings are used, the second level terminates when the similarity scores of the candidates deteriorate compared to the global scores.

The third level enables a model to be created using machine learning techniques. This resulting model can further improve the overall precision and recall rates. This model may be implemented through a variety of processes, rules, and/or patterns.

The system may generate patterns for use in pattern recognition. For instance, "feature spaces" may be used as machine learning techniques. In pattern recognition, a feature space may be thought of as an abstract space where each pattern sample is represented as a point in n-dimensional space. Its dimension is determined by the number of features used to describe the patterns. Similar samples may be grouped together, which allows the use of density estimation for finding patterns. Several example feature spaces that may be used to enable pattern recognition are described below.

The first feature space uses individual terms as features, and may follow a bag of words model. The bag of words model is a simplifying assumption used in natural language processing and information retrieval. In the bag of words model, a segment of text (sentence or document) is represented as an unordered collection of words, disregarding grammar and word order. Very rarely occurring terms may be excluded from the feature space.

Some common individual terms may not be significantly useful. However, when they are part of a multi term phrase, this new feature may be useful in the model. As a second feature space, multi-term phrases may be included in the bag of words model. A multi-term phrase may be a phrase whose terms co-occur frequently in the documents. The multi-term phrases may be generated in an approach such as point-wise mutual information.

The third feature space proposed uses prefix and suffix strings that immediately precede or follow the candidates (or seed examples) as features. Each unique prefix or suffix may represent a unique feature in the space.

Once a model (e.g., set of rules) is created, it may be run on all candidates that were obtained in the first level at 418 to identify the final set of seed examples as shown at 420. Specifically, the final set of seed examples may be identified using pattern recognition. This model may also be used on new documents for a real time extraction.

In order to create a model, support vector machines may be implemented. This may be accomplished using an open source library for SVM model creation. Two approaches may be followed for creating models: (1) Seed examples and their contexts may be used as positive examples (i.e., positive set) in order to create a one-class model as shown at 422, or (2) In addition to using seed examples as positive examples, the candidates that are most dissimilar with respect to the seed examples may be used as negative examples (i.e., negative set) as shown at 424. The model may also learn statistical rules, which may not be possible to learn during iterations. The model may also be used later on additional documents during a real-time extraction.

The three-level process described above with reference to FIG. 4 may be applied in the extraction of semi-structured named entities. In order to illustrate this process, we describe an example with respect to the extraction of international phone numbers.

In the first level, a module may be used to extract a large set of candidates for international phone numbers. Specifically, the module may make a single pass over the documents to find sequences of digits that may be separated only by the following characters: " ", "−", "+", "(", ")", ".", "/", "[", "]", "*". For any sequence found, the module may check that the number of digits are no less than seven and no greater than thirteen.

Figure 5:
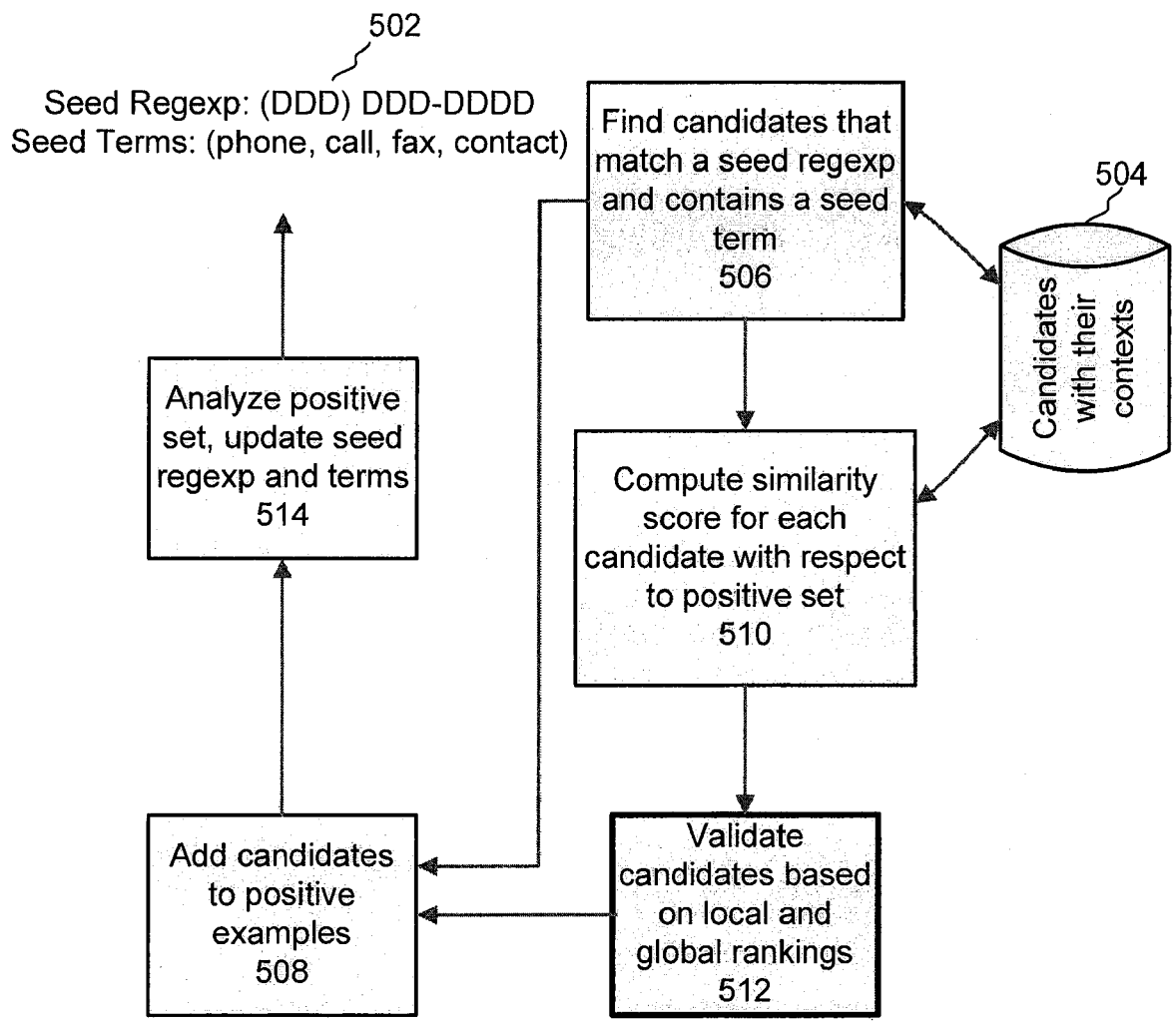
FIG. 5 is a process flow diagram illustrating an example method of extracting international phone numbers at the second level of the three-level framework of FIG. 4.

FIG. 5 is a process flow diagram illustrating an example method of extracting international phone numbers at the second level of the three-level framework of FIG. 4. As shown in this example, the set of seed examples may include one or more seed examples. A seed example may include a seed pattern and have a corresponding context including one or more seed terms. Specifically, the seed example 502 may include a regular expression (DDD) DDD-DDDD and have corresponding seed terms (phone, call, fax, contact).

First, the system may run the regular expression on all of the candidates as shown at 504 to find those candidates that match the expression. Where the set of seed examples includes one or more expressions, the system may find those candidates that match at least one of the expressions. In addition, the system may also ensure that those candidates that match the expression also include at least a predetermined number (e.g., one) of the seed terms as shown at 506 in order to generate the positive set at 508. Second, the system may compute similarity scores for each candidate with respect to the existing positive set at 510, and add the best candidates to the positive set. As described above, local and/or global rankings may be used to determine the best candidates at 512. The system may then analyze all of the candidates in the positive set at 514, and may add a subset of the candidates in the positive set to the seed examples 502. Specifically, the system may add new regular expressions and/or new seed terms to the set of seed examples.

In order to add a regular expression to the set of seed examples, the system may make a pass over all of the candidates (e.g., phone numbers) found in the positive set, and replace each of the digits with a special character (e.g., "D"). The system may then count the occurrences of all of the regular expressions found, including the initial seed expression(s), and identify a number (e.g., two) of the most frequently occurring two non-seed regular expressions. During this process, the most frequently occurring and least frequently occurring seed expressions may also be found (with their frequencies of $f_{max}$ and $f_{min}$, respectively). To avoid adding incorrect expressions to the set of seed examples, the system may ensure that the frequencies of the most frequent two non-seed expressions are larger than $\max(f_{max}/5, f_{min})$.

In order to add new seed terms to the contexts of the set of seed examples, the system may first identify frequently occurring terms in the contexts of the positive examples. The system may then compare tf and idf values of these terms to the average values observed for the seed terms, and add the terms to the set of seed examples if they are larger.

The third level is implemented as set forth above with reference to FIG. 4. In addition to the contextual features that were discussed, additional features based on the regular expressions may also be added. Specifically, each unique regular expression may be added as a feature.

A one-class model may be created using only positive examples, while a classifier model may be created using both positive and negative examples. The number of positive examples that have the same regular expression may also be applied in the generation of the models. Specifically, the score obtained via application of the longest string metric may be multiplied by the ratio of positive examples with the same expressions to all positive examples.

The disclosed embodiments may be applied in a variety of applications. These applications may involve the detection of semi-structured entities such as phone numbers, dates, times, weights, distances, etc.

Search engines may use phone numbers found in documents to improve overall relevancy. For example, if the intent of a search is to find contact information, then the search engine can more accurately identify web pages that contain phone numbers. Similarly, phone numbers may also be used to improve geographic search engines. For example, the area codes of phone numbers that are found in web pages may be leveraged.

Another application that would benefit from the disclosed embodiments is the de-identification of documents. For instance, for the health research community, any private information, such as phone numbers, dates, and times, generally are removed before any medical record can be released or shared.

Date and time entities are also useful for search engines, since they can be used to improve results for time sensitive queries. Such applications may further involve semantic analysis of the date and time entities, in addition to the initial detection of the date and/or time.

Remaining semi-structured entities such as currency, weight, distance, etc. may be useful in applications such as content classification systems. For example, detection of currency entities may be a good indicator that the document is about finance. Accordingly, applications that use classifiers, such as advertisement systems, may also benefit from semi-structured entity detection. Specifically, once web pages are classified, a search engine may identify the best web advertisements to place in those web pages.

Figure 6:
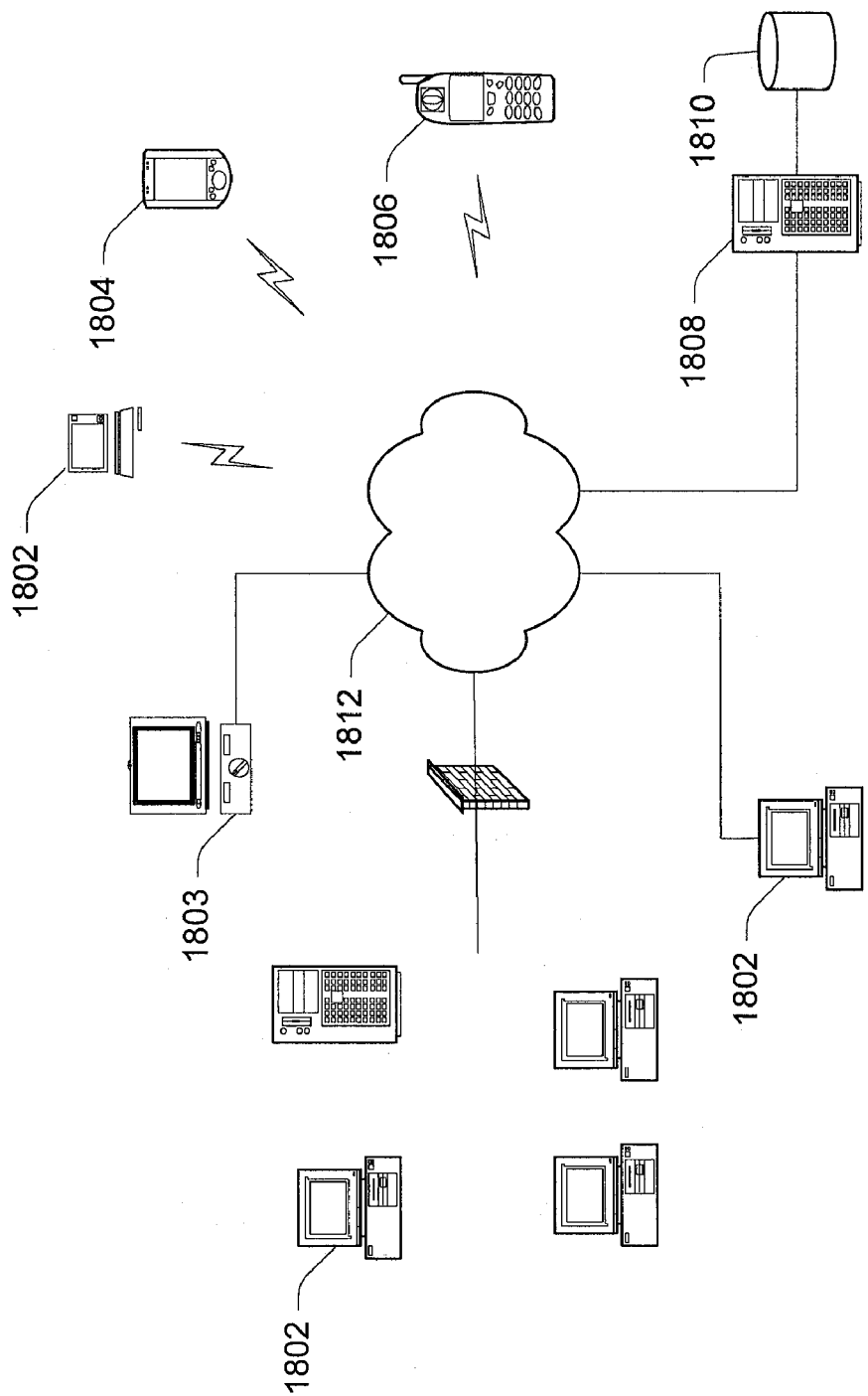
FIG. 6 is a simplified diagram of a network environment in which various embodiments may be implemented.

Embodiments of the present invention may be employed to automatically generate seed examples in any of a wide variety of computing contexts. For example, as illustrated in FIG. 6, implementations are contemplated in which users interact with a diverse network environment via any type of computer (e.g., desktop, laptop, tablet, etc.) 1802, media computing platforms 1803 (e.g., cable and satellite set top boxes and digital video recorders), handheld computing devices (e.g., PDAs) 1804, cell phones 1806, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Seed examples may be generated and processed according to the invention in some centralized manner. This is represented in FIG. 6 by server 1808 and data store 1810 which, as will be understood, may correspond to multiple distributed devices and data stores. The invention may also be practiced in a wide variety of network environments (represented by network 1812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store documents, seed examples and corresponding contexts, seed expressions and corresponding seed terms, candidates and corresponding contexts, computer-generated rules or patterns for generating seed examples, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
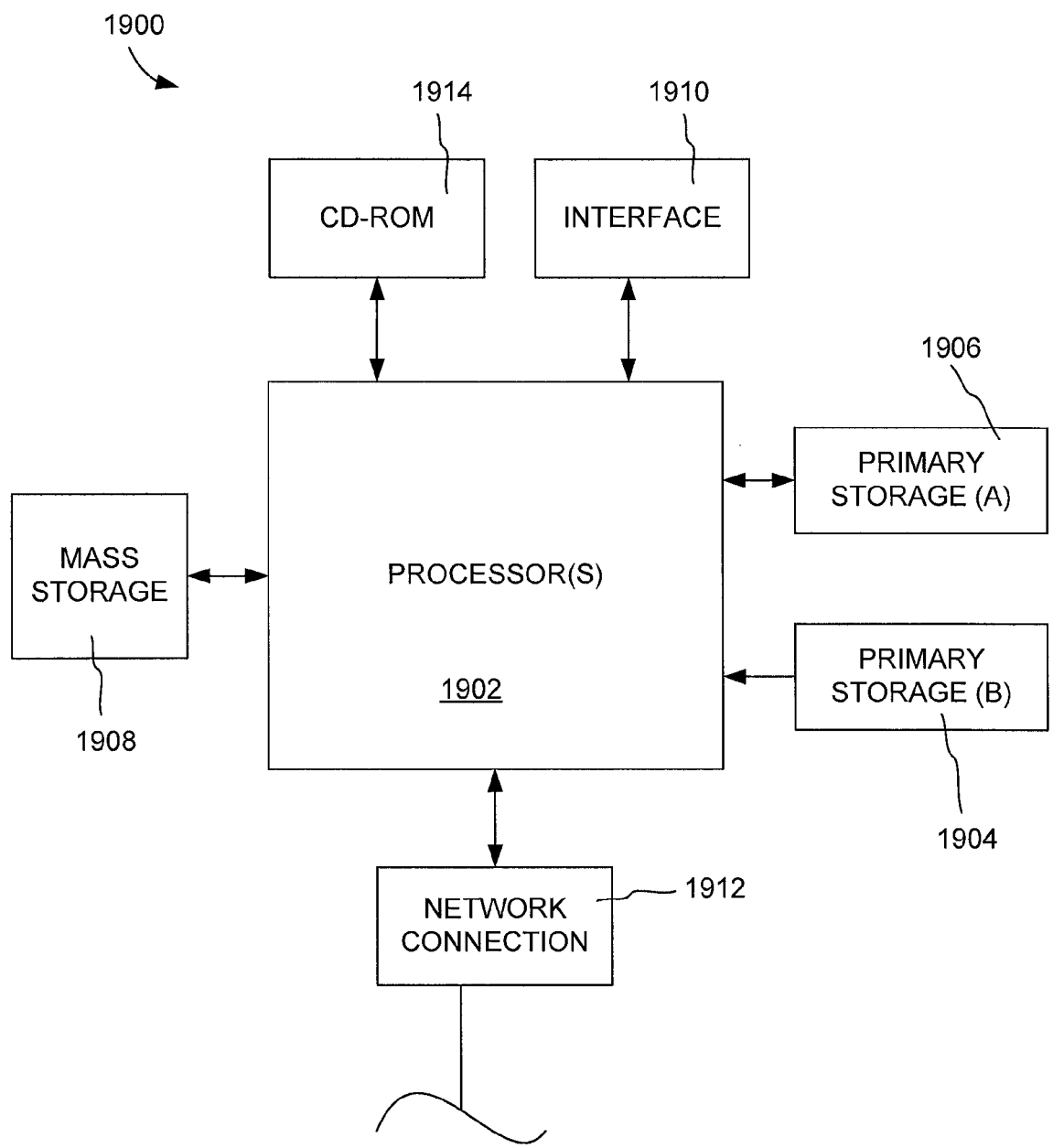
FIG. 7 illustrates an example computer system in which various embodiments may be implemented.

FIG. 7 illustrates a typical computer system that, when appropriately configured or designed, can serve as a system of this invention. The computer system 1900 includes any number of processors 1902 (also referred to as central processing units, or CPUs) that are coupled to storage devices including primary storage 1906 (typically a random access memory, or RAM), primary storage 1904 (typically a read only memory, or ROM). CPU 1902 may be of various types including microcontrollers and microprocessors such as programmable devices (e.g., CPLDs and FPGAs) and unprogrammable devices such as gate array ASICs or general purpose microprocessors. As is well known in the art, primary storage 1904 acts to transfer data and instructions uni-directionally to the CPU and primary storage 1906 is used typically to transfer data and instructions in a bi-directional manner. Both of these primary storage devices may include any suitable computer-readable media such as those described above. A mass storage device 1908 is also coupled bi-directionally to CPU 1902 and provides additional data storage capacity and may include any of the computer-readable media described above. Mass storage device 1908 may be used to store programs, data and the like and is typically a secondary storage medium such as a hard disk. It will be appreciated that the information retained within the mass storage device 1908, may, in appropriate cases, be incorporated in standard fashion as part of primary storage 1906 as virtual memory. A specific mass storage device such as a CD-ROM 1914 may also pass data uni-directionally to the CPU.

CPU 1902 may also be coupled to an interface 1910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1902 optionally may be coupled to an external device such as a database or a computer or telecommunications network using an external connection as shown generally at 1912. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    obtaining a set of candidates and corresponding contexts, each of the set of candidates being a potential seed example of an entity;
    obtaining a set of seed examples of the entity and corresponding contexts;
    identifying a subset of the set of candidates to be added to the set of seed examples, at least in part, by comparing the contexts of at least a portion of the set of candidates with the contexts of the set of seed examples of the entity;
    adding the subset of the set of candidates to the set of seed examples;
    creating a set of rules from the set of seed examples obtained in the adding step; and
    generating a final set of seed examples of the entity by executing the set of rules against the set of candidates.

2. The method as recited in claim 1, wherein obtaining the set of candidates and corresponding contexts comprises:
    obtaining the set of candidates and corresponding contexts from a plurality of documents.

3. The method as recited in claim 2, wherein each of the plurality of documents includes one or more web pages.

4. The method as recited in claim 1, wherein each of the corresponding contexts includes at least one of text preceding or text following a corresponding one of the set of candidates.

5. The method as recited in claim 1, wherein comparing the contexts of at least a portion of the set of candidates with contexts of a set of seed examples of the entity comprises:
comparing contexts of each of the set of candidates with contexts in which one or more of the set of seed examples appear in order to obtain the subset of the set of candidates having contexts most similar to contexts of the set of seed examples.

6. The method as recited in claim 5, further comprising:
computing a similarity score for each of the set of candidates with respect to the set of seed examples; and
comparing the similarity scores of the set of candidates.

7. The method as recited in claim 6, wherein computing a similarity score comprises:
identifying terms in the contexts of one of the set of candidates that match terms in the contexts of the set of seed examples;
assigning a score to each of the matching terms; and
summing the scores of the matching terms.

8. The method as recited in claim 7, further comprising:
ascertaining a distance for each matched term in both the candidate and seed example contexts; and
summing the distance in the candidate and the set of seed examples for a matched term, wherein the distance is a sum of word positions of the matched term in both the candidate and seed example contexts.

9. The method as recited in claim 6, wherein computing a similarity score comprises:
identifying a length of a longest prefix of the contexts of one of the set of candidates, wherein the prefix is shared by at least one of the set of seed examples; and
identifying a length of a longest suffix of the contexts of the one of the set of candidates, wherein the suffix is shared by at least one of the set of seed examples.

10. The method as recited in claim 1, wherein each of the set of seed examples is represented by an expression and a context of each of the set of seed examples includes one or more seed terms.

11. The method as recited in claim 1, further comprising:
identifying the portion of the set of candidates by comparing the set of seed examples with the set of candidates.

12. The method as recited in claim 11, wherein each of the set of seed examples includes an expression, wherein identifying the portion of the set of candidates comprises:
comparing the expressions of the set of seed examples with the set of candidates to identify a portion of the set of candidates that each match at least one of the expressions;
wherein adding includes converting each of the subset of the set of candidates to an expression.

13. The method as recited in claim 1, wherein the entity is a semi-structured entity.

14. The method as recited in claim 13, wherein the semi-structured entity is a phone number entity, date entity, time entity, currency entity, weight entity, or distance entity.

15. A computer-readable medium storing thereon computer-readable instructions, comprising:
instructions for obtaining a set of candidates and corresponding contexts, each of the set of candidates being a potential seed example of an entity and each of the corresponding contexts including one or more seed terms;
instructions for obtaining a set of seed examples of the entity and corresponding contexts, wherein each of the set of seed examples includes an expression and each of the corresponding contexts includes one or more seed terms;
instructions for comparing the expressions of the set of seed examples with the set of candidates to find a positive set of candidates that each match at least one of the expressions;
instructions for comparing the contexts of the positive set of candidates with contexts of the set of seed examples of the entity to determine a similarity score associated with each of the set of candidates;
instructions for ranking the set of candidates according to the corresponding similarity scores;
instructions for selecting a subset of the set of candidates according to the ranking;
instructions for adding at least one of the selected subset of the set of candidates to the set of seed examples, wherein adding includes converting each of the selected subset of the set of candidates to an expression;
instructions for creating a set of rules from the set of seed examples resulting from the adding step; and
instructions for generating a final set of seed examples of the entity by executing the set of rules against the set of candidates, wherein each seed example in the final set of seed examples includes an expression.

16. The computer-readable medium as recited in claim 15, wherein comparing the expressions of the set of seed examples with the set of candidates to find a positive set of candidates that each match at least one of the expressions further comprises:
excluding candidates in the positive set of candidates that do not include at least one of the seed terms associated with the set of seed examples.

17. The computer-readable medium as recited in claim 15, wherein the entity is a semi-structured named entity.

18. An apparatus, comprising:
a processor; and
a memory, at least one of the processor or the memory being adapted for:
obtaining a set of candidates and corresponding contexts, each of the set of candidates being a potential seed example of an entity;
obtaining a set of seed examples of the entity;
comparing the contexts of at least a portion of the set of candidates with contexts of the set of seed examples of the entity to determine a similarity score associated with each of the set of candidates;
ranking the at least a portion of the set of candidates according to the corresponding similarity scores;
selecting a subset of the set of candidates according to the ranking;
adding at least one of the selected subset of the set of candidates to the set of seed examples;
creating a set of rules from the set of seed examples resulting from the adding step; and
generating a final set of seed examples of the entity by executing the set of rules against the set of candidates.

19. The apparatus as recited in claim 18, wherein ranking the set of candidates comprises:
ranking the set of candidates based upon the similarity scores for a single iteration.

20. The apparatus as recited in claim 18, at least one of the processor or the memory being further adapted for:

removing the subset of the set of candidates and corresponding contexts from the set of candidates and corresponding contexts; and repeating the comparing, ranking, selecting, and adding steps for two or more iterations.

21. The apparatus as recited in claim 20, wherein ranking the at least a portion of the set of candidates comprises:

ranking the at least a portion of the set of candidates based upon the similarity scores for the two or more iterations.

22. The apparatus as recited in claim 20, wherein ranking the at least a portion of the set of candidates comprises:

ranking the at least a portion of the set of candidates based upon the similarity scores for the current iteration to obtain a local ranking; and ranking the at least a portion of the set of candidates based upon the similarity scores for the two or more iterations to obtain a global ranking;

wherein selecting the subset of the set of candidates according to the ranking is performed according to the local ranking and the global ranking.

23. The apparatus as recited in claim 20, at least one of the processor or the memory being further adapted for:

discontinuing the iterations when a number of the selected subset of candidates is less than a predetermined threshold.

24. The apparatus as recited in claim 18, wherein each of the set of seed examples is represented by a regular expression and each corresponding context includes one or more seed terms, wherein each of the final set of seed examples is represented by a regular expression and one or more seed terms, and wherein adding the selected subset of the set of candidates to the set of seed examples comprises:

converting each of the subset of the set of candidates to a regular expression.

25. The apparatus as recited in claim 24, wherein adding at least one of the selected subset of the set of candidates to the set of seed examples further comprises:

adding one or more seed terms from seed terms associated with the subset of the set of candidates to the seed terms of the set of seed examples.

26. The apparatus as recited in claim 24, at least one of the processor or the memory being further adapted for:

comparing the regular expressions of the set of seed examples with the set of candidates to find a positive set of candidates that each match at least one of the expressions; and comparing seed terms of the positive set of candidates with the seed terms of the set of seed examples to identify at least a portion of the set of candidates containing at least one of the seed terms of the set of seed examples.

27. The apparatus as recited in claim 24, at least one of the processor or the memory being further adapted for:

comparing the regular expressions of the set of seed examples with the set of candidates to find at least a portion of the set of candidates that each match at least one of the expressions.

\* \* \* \* \*